Patented Jan. 20, 1953

2,626,252

UNITED STATES PATENT OFFICE 2,626,252

INTERPOLYMERS OF TRIHALOALKENES

Pliny O. Tawney, Passaic, N. J., assignor to United States Rubber Company, New York, N. Y., a corporation of New Jersey No Drawing. Application November 12, 1948, Serial No. 59,789

13 Claims. (Cl. 260—78.5)

My invention relates to a new class of flame-retardant resins which are interpolymers of a trichloroalkene having from 3 to 5 carbon atoms with one or more other compounds having from 1 to 4 ethylenic linkages. More specifically, my invention relates to new interpolymers resulting from the interpolymerization of an olefinic compound, or mixtures of such compounds with a trichloroalkene from the class of trichloropropenes, trichlorobutenes and trichloropentenes. These interpolymerizable trichloroalkenes are obtainable from the corresponding tetrachloroalkanes by dehydrochlorination with alkali, for example, heating the trichloroalkane, such as 1,1,1,3-tetrachloropropane, with from 1 to 2 molar equivalents of sodium or potassium hydroxide, and subsequently diluting with water and recovering the trichloroalkene from the non-aqueous portion by fractional distillation. The preferred class of trichloroalkenes consists of those containing both a trichloromethyl group and a terminal ethylenic linkage, e. g., 3,3,3-trichloropropene, 4,4,4-trichloro-1-butene, and 4,4,4-trichloro-2-methyl-1-butene, the 3,3,3-trichloropropene being especially preferred. While other isomeric trichloroalkenes are operable in my invention, those containing no terminal ethylenic linkage, e. g., 1,1,1-trichloro-2-butene, interpolymerize somewhat less readily, while those containing no trichloromethyl group, e. g., 1,1,3-trichloropropene, may occasionally yield interpolymers which, however, are of somewhat inferior resistance to aging, discoloration, thermal decomposition and flame, possibly because of the existence of labile chlorine atoms in the interpolymers. Higher homologs such as trichlorohexenes and trichloroheptenes are less readily available and are of little practical utility in my invention. On a weight basis they are markedly less effective than the lower homologs in endowing the interpolymers with a comparable degree of flame resistance. The above trichloroalkenes can be replaced in whole or part by corresponding trifluoroalkenes, particularly 3,3,3-trifluoropropene, although the fluoroalkenes tend to be somewhat less reactive in copolymerization.

In my invention at least one of the specified trichloroalkenes is interpolymerized with one or more olefinic compounds from the class consisting of: (a) olefinic hydrocarbons (e. g., ethylene, propylene, butene-1, isobutylene, 1,3-butadiene, 2-methyl-1,3-butadiene, 1,5-hexadiene, styrene, alpha-methylstyrene, p-methylstyrene, divinyl benzene, vinyl naphthalene); (b) halogenated olefinic hydrocarbons (e. g., vinyl fluoride, vinyl chloride, vinylidene fluoride, vinylidene chloride, trichloroethylene, allyl chloride, methallyl chloride, 2,3-dichloropropene, 2-chloro-1,3-butadiene, p-chlorostyrene, p-fluorostyrene, 2,5-dichlorostyrene); (c) olefinic alcohols having 3 or more carbon atoms and particularly the allylic type alcohols (e. g., allyl alcohol, methallyl alcohol, ethallyl alcohol, chloroallyl alcohol, crotyl alcohol and cinnamyl alcohol); (d) ethers of olefinic alcohols and particularly the ethers of vinyl and allylic type alcohols (e. g., vinyl ethyl ether, vinyl butyl ether, vinyl cyclohexyl ether, vinyl phenyl ether, vinyl tolyl ether, vinyl benzyl ether, divinyl ether, methyl isopropenyl ether, allyl ethyl ether, beta-allyloxyethanol, methallyl ethyl ether, methallyl benzyl ether, methallyl phenyl ether, 2-chloroallyl ethyl ether, allyl 2-naphthyl ether, diallyl ether, 1,2-diallyloxyethane, dimethallyl ether, dichloroallyl ether, 1,4-diallyloxybenzene); (e) esters of olefinic alcohols with acids devoid of olefinic and acetylenic unsaturation, i. e., nonenic acids (e. g., vinyl acetate, isopropenyl acetate, vinyl chloroacetate, vinyl propionate, vinyl n-butyrate, divinyl oxalate, vinyl benzoate, divinyl phthalate, allyl acetate, allyl chloroacetate, allyl glycollate, methally acetate, choroallyl acetate, cinnamyl acetate, allyl butyrate, allyl stearate, diallyl adipate, triallyl carballylate, allyl benzoate, allyl p-chlorobenzoate, allyl p-methoxybenzoate, diallyl phthalate, dimethallyl phthalate, diallyloxyethyl phthalate, triallyl phosphate, tetramethallyl silicate); (f) alkenyl ketones (e. g., vinyl methyl ketone, isopropenyl methyl ketone, allyl methyl ketone, mesityl oxide, allyl phenyl ketone, diallyl ketone); (g) olefinic acids, particularly the alpha-olefinic acids of from 3 to 8 carbon atoms, and derivatives hydrolyzable to such acids such as the acid chlorides, nitriles, anhydrides, the alkyl, alkenyl, aryl and aralkyl esters, and the amides and imides (e. g., acrylic acid, methacrylic acid, ethacrylic acid, methyl acrylate, vinyl acrylate, allyl acrylate, phenyl acrylate, tolyl acrylate, benzyl acrylate, methyl methacrylate, methyl chloroacrylate, methyl ethacrylate, methyl crotonate, acrylamide, N-methylmethacrylamide, N-phenylacrylamide, N-allylacrylamide, acrylonitrile, diethyl maleate, maleic anhydride, maleimide, N-methylmaleimide, N-phenylmaleimide, N-benzylmaleimide, diethyl fumarate, dioctyl fumarate, diallyl fumarate, diallyoxyethyl fumarate, fumaronitrile, itaconic anhydride, di-2-ethylhexyl itaconate, itacononitrile, diallyl itaconate, diallyl mesaconate, diallyl citraconate, triallyl aconitate, diallyl muconate and diallyl dihydromuconate); and (h) vinyl heterocyclic compounds from the group of 2-vinyl pyridine, 2-vinylfuran, and 2-vinylthiophene.

The properties of the resulting interpolymers will vary to a considerable extent with the amount and type of olefinic compound employed. The interpolymerization of the trichloroalkenes with other monoolefinic compounds yields a class of soluble, thermoplastic resins of varying character. For example, the interpolymerization of a trichloroalkene with monoolefinic hydrocarbons yields polymeric products possessing a considerable degree of compatibility with cheap, higher-boiling hydrocarbon solvents, an important factor in the formulation of surface-coating compositions. Products of a high degree of flame-resistance, as well as products which are completely non-flammable, can be obtained by interpolymerization of the trichloroalkene with halogenated monoolefinic compounds, particularly the more highly halogenated olefinic hydrocarbons. The interpolymers of the trichloroalkenes with olefinic alcohols and/or olefinic acids display considerable sensitivity to hydroxylic solvents and can be dispersed therein for use in coating, impregnating and adhesive-bonding operations. The interpolymers of the trichloroalkenes with alkenyl monoethers of non-enic alcohols, the alkenyl monoesters of non-enic acids, and the esters of monoolefinic acids with non-enic alcohols, are much more insensitive to hydroxylic solvents; they also yield more flexible products, particularly when alkenyl monoethers or monoolefinic acid esters of higher alkanols, e. g., n-octanol and 2-ethylhexanol, and/or alkenyl monoesters of higher alkanoic acids, e. g., valeric acid, are employed. In cases where optimum hardness is desired, the interpolymers of the trichloroalkenes with monoalkenenitriles, monoalkeneamides and monoalkeneimides are preferred.

Thus, by proper choice of the monoolefinic compound, and of the proportion thereof in the initial reactant mixture, considerable variation in the characteristics, e. g., softening point, flame-resistance, hardness and flexibility of the resulting soluble, thermoplastic interpolymers can be secured.

A preferred class of the interpolymerizable monoolefinic compounds are those of the type formula RCH=CHR where the R's are identical substituents from the class of carboxy, carbalkoxy (e. g., carboethoxy), carbaryloxy (e. g., carbophenoxy), carbaralkoxy (e. g., carbobenzyloxy), carbamyl, N-alkylcarbamyl, N-arylcarbamyl, and carbonitrile, or the R's together may stand for dicarbanhydro (—CO—O—CO—) or dicarbimido (—CO—NR'—CO—) where R' is hydrogen, alkyl (e. g., methyl, ethyl, butyl), aryl (e. g., phenyl), or aralkyl (e. g., benzyl). Another preferred class of monoolefinic compounds consists of those having the type formula $$H_2C=CR''R'''$$

where R'' is R as defined above or hydrogen, methyl or chlorine, and R''' is R'' as defined above or aryl (e. g., phenyl, p-chlorophenyl, tolyl, xylyl), or non-enic acyloxy (e. g., formyloxy, acetoxy, propionoxy, butyroxy, benzoyloxy).

Interpolymerization of polyolefinic compounds, on the other hand, with the trichloroalkenes yields insoluble, cross-linked and, in many cases, essentially infusible products. However, I have discovered one notable exception in the case of esters of monoolefinic alcohols wherein the ester contains at least one additional olefinic linkage. I have found that, although such polyolefinic esters, e. g., allyl acrylate, diallyl oxalate, and diallyl fumarate, polymerize by themselves to yield insoluble, cross-linked products before more than a minor proportion of the monomeric ester has been converted to the polymeric form, their interpolymerization with the trichloroalkenes of my invention proceeds in an anomalous and unexpected fashion whereby the major proportion of polyolefinic ester is converted to the soluble, interpolymeric form without danger of premature gelation. The presence of as little as about 0.1 mole of the trichloroalkene (per mole of the polyolefinic ester) in the initial reactant mixture is sufficient to obtain a significant increase in the conversion of the monomeric polyolefinic ester to the soluble, polymeric form. This conversion increases as the amount of the interpolymerizable trichloroalkene present is increased, until in the presence of about 2–5 moles of the latter the major proportion of the polyolefinic ester is converted to the soluble, interpolymeric form. Even higher conversions can be attained in the presence of larger amounts of the trichloroalkene, e. g., 7–10 moles, and indeed a considerable excess, e. g., 10–25 moles, may be employed since the resulting mobile solutions are readily handled in subsequent transfer, mixing, storage and other mechanical operations to which the solid interpolymers themselves may be less amenable.

My discovery of a method for converting polyolefinic esters to the soluble polymeric form in high yields has solved a problem to which the prior art has long and unsuccessfully addressed itself. It has long been recognized that such polyolefinic esters would be of prime industrial importance if they could be obtained in an initially soluble, fusible form which, after application, as by molding or coating, could be subsequently "cured" or converted to a solvent- and heat-resistant state. My process has now for the first time provided an economically feasible method of obtaining this type of homogeneous, soluble, convertible resin in high yields and by a comparatively simple operation which requires none of the devices such as excessive temperatures, large amounts of catalysts, inhibitors and diluents heretofore employed by the art in ineffectual attempts to postpone or avert gelation of a polymerizing polyolefinic ester.

Suitable polyolefinic esters include both vinyl and allyl esters, of which the latter are preferred. Included within this group are (a) the esters of allyl-type alcohols having the general formula R*CH=CR*—CH₂—OH in which one R* is hydrogen and the other R* is one of the radicals hydrogen, chlorine, methyl, ethyl and phenyl, and (b) the esters of allyloxyalkanols of the formula $$R^*CH=CR^*—CH_2—O—CHR\phi—CHR\phi—OH$$

in which R* is as defined above, and Rφ is hydrogen or alkyl (e. g., methyl, ethyl, propyl, butyl, amyl, hexyl, heptyl, and octyl). Exemplary of such alcohols are allyl, methallyl, ethallyl, chloroallyl, crotyl, cinnamyl, beta-allyloxyethyl, beta-methallyloxyethyl and beta-allyloxypropyl alcohols of which those in which the terminal substituent R* is hydrogen are preferred. The polyolefinic esters derived from the allyloxyalkanols are of particular interest to the surface-coating industry since such esters yield "air-drying" polymers in many cases.

Such olefinic alcohols can be esterified with olefinic monocarboxylic acids and with both non-enic and olefinic polybasic acids to yield polyolefinic esters for use in my invention. Exemplary of the former class are the acrylic acids of the general formula R*CH=CR*—COOH, in which R* is as defined above. Exemplary of such acids are acrylic, methacrylic, ethacrylic, chloracrylic, crotonic and cinnamic acids. The terminal R* is preferably hydrogen. Of the polybasic acids, the olefinic and in particular the alpha-olefinic acids are preferred by reason of the ready interpolymerizability of their alkenyl esters according to my invention as well as because of the high yields of soluble, convertible resins obtained therefrom and the desirable properties of the final cured products, including toughness, adhesion and flexibility. Such acids include fumaric, itaconic, maleic, citraconic, mesaconic and aconitic in the approximate order of their preference based on the above criteria as well as on cost and availability.

The polyalkenyl esters of the non-enic polycarboxylic acids can likewise be employed in my invention. Exemplary of such acids are oxalic, malonic, alpha-methylmalonic, succinic, glutaric, adipic, pimelic, azelaic, and phthalic acids, of which the latter is especially preferred. In general, alkenyl esters of this type tend to interpolymerize somewhat less rapidly than the esters of the previously defined classes, and the curing of the resulting resins often requires more stringent conditions. The interpolymerizability of such esters can be improved by the inclusion in the initial reaction mixture of a copolymerizable monoolefinic acid or a hydrolyzable derivative thereof, e. g., diethyl fumarate or methyl acrylate.

Another useful class of polyalkenyl esters are those derived from inorganic polybasic acids, e. g., carbonic, and sulfuric, and particularly those derived from the tri- and tetra-valent acids including phosphoric, silicic, stannic and titanic acids. The alkenyl esters derived from this latter group yield, by my method, soluble, convertible interpolymers which are useful as baking enamels and for making non-flammable plastic objects capable of withstanding high temperatures. Like the polyalkenyl esters of the non-enic polycarboxylic acids, the polyalkenyl esters of the polybasic inorganic acids often interpolymerize more readily and yield more satisfactory resins when a copolymerizable monoolefinic compound such as an alkenoic acid or hydrolyzable derivative thereof is also present in the interpolymerization reactant mixture.

A representative list of the polyolefinic esters useful in my invention, as defined, includes allyl acrylate, allyl methacrylate, beta-allyloxyethyl acrylate, chlorallyl acrylate, allyl chloroacrylate, allyl ethacrylate, methallyl cinnamate, ally crotonate, crotyl acrylate, diallyl fumarate, dimethallyl fumarate, di-beta-allyloxyethyl fumarate, di-beta-methallyloxyethyl fumarate, diallyl itaconate, di-beta-allyloxyethyl itaconate, dimethallyl maleate, diallyl citraconate, dimethallyl citraconate, triallyl aconitate, diallyl oxalate, diallyl succinate, dichloroallyl adipate, dicrotyl succinate, dimethallyl adipate, di-beta-allyloxyethyl adipate, diallyl phthalate, dimethallyl phthalate, di(chloroallyl)phthalate, di-beta-allyloxyethyl phthalate, diallyl carbonate, diallyl sulfate, triallyl phosphate, trimethallyl phosphate, tri - beta - allyloxyethyl phosphate, tetraallyl silicate, tetra-methallyl stannate, and tetraallyl titanate.

As indicated above, the interpolymerization of the polyolefinic esters with the trichloroalkenes can also be carried out in the presence of a monoolefinic, third copolymerizable compound to secure high yields of soluble, convertible polymeric materials. A particularly suitable and efficacious class of such compounds are those having the type formula XX'C=CX''X''' wherein X may be hydrogen, fluorine or methyl; X' may be hydrogen, fluorine, carboxyl or a group hydrolyzable to carboxyl such as carboalkoxy (e. g., carbomethoxy, carbethoxy and carbohexoxy), carboaryloxy (e. g., carbophenoxy and carbotolyloxy), carbaralkoxy (e. g., carbobenzyloxy), carbamyl, N-alkylcarbamyl (e. g., N-methylcarbamyl), N-arylcarbamyl (e. g., N-phenylcarbamyl), and carbonitrilo; X'' may be hydrogen, lower alkyl (e. g., methyl and ethyl), chlorine, fluorine, carboxyl or a group hydrolyzable to carboxyl as defined above; X''' may be hydrogen, methyl, chlorine, fluorine, aryl (e. g., phenyl, p-chlorophenyl, tolyl, naphthyl), carboxyl or a group hydrolyzable to carboxyl, alkoxy (e. g., methoxy, ethoxy, propoxy, isopropoxy, butoxy, amyloxy, hexoxy, heptoxy, octoxy, nonoxy, decoxy), aryloxy (e. g., phenoxy, tolyloxy, naphthoxy, p-chlorophenoxy, p-methoxyphenoxy), aralkoxy (e. g., benzyloxy), acyloxy where the acyl group is devoid of olefinic and acetylenic unsaturation (e. g., acetoxy, propionoxy, butyroxy and benzoyloxy), acyl as previously defined (e. g., acetyl, propionyl, isobutyryl, benzoyl); and, when X'' is carboxyl or a group hydrolyzable thereto, X''' may additionally be carboxymethyl or a group hydrolyzable thereto, as defined above; furthermore, X''' may together with X' comprise a dicarbanhydro group (—CO—O—CO—)

or a dicarbimido group (—CO—NRφ—CO—), where Rφ is hydrogen, alkyl (e. g., methyl, ethyl, propyl, isopropyl, butyl, isobutyl, amyl, cyclopentyl, hexyl, cyclohexyl, heptyl, octyl, nonyl, decyl), aryl (e. g., phenyl, tolyl, xylyl, xenyl, naphthyl) or aralkyl (e. g., benzyl, beta-phenylethyl).

Of these copolymerizable monoolefinic compounds, the following classes are especially preferred:

Class A.—$CH_2=CX''X'''$, where X'' is hydrogen or methyl, and X''' is chlorine, fluorine, acyloxy, aryl, alkoxy, aryloxy, aralkoxy, carbalkoxy, carbonitrilo, carbamyl, or acyl.

Class B.—$CH_2=CX''X'''$, where X'' and X''' are identical substituents from the class of methyl, chlorine, fluorine, carbalkoxy and carbonitrilo.

Class C.—, where X and X'' are hydrogen or methyl and X' and X''' are carbalkoxy or carbonitrilo.

Exemplary of the above compounds are isobutylene, vinyl chloride, vinylidene chloride, vinyl butyrate, methyl vinyl ketone, n-butyl acrylate, tolyl acrylate, benzyl acrylate, methyl methacrylate, beta-chloroethyl acrylate, ethyl alpha-chloroacrylate, acrylamide, N-methyl acrylamide, acrylonitrile, methacrylonitrile, fumaronitrile, diethyl fumarate, dibutyl maleate, dimethyl mesaconate, dimethyl citraconate, dihexyl itaconate, maleimide, N-butyl maleimide, vinyl n-butyl ether, vinyl hexyl ether, vinyl phenyl ether, and vinyl benzyl ether.

By appropriate choice of the third copolymerizable compound (monoolefinic), numerous variations in the properties of the resulting soluble, unsaturated interpolymers can be attained. Thus, interpolymers of greater hardness are formed when the third copolymerizing ingredient is one of the class of olefinic acid nitriles, amides and imides, such as acrylonitrile, methacrylamide, and maleimide, while softer and more flexible products are secured when the third copolymerizable compound is an olefinic acid ester of a non-enic monohydric alcohol, particularly of a higher aliphatic alcohol. Such esters are exemplified by the butyl, 2-ethylhexyl and n-octyl esters of acrylic, methacrylic, maleic, fumaric and itaconic acids.

In the practice of my invention, the copolymerizable olefinic compound of the above class or mixture thereof is heated, e. g., at 25–200° C. and particularly at 60–120° C. with from 0.1 to 25, preferably 0.1 to 12, molar equivalents of a trichloroalkene (or mixture thereof) and with from 0.0 to 8.0, preferably from 0.0 to 5.0, molar equivalents of a copolymerizable monoolefinic compound as defined above.

The reaction times will vary depending upon the interpolymerizable reactants employed as well as on the relative proportions thereof; times in the range of from 0.5 to 200 hours are usually sufficient; although longer times, e. g., 300–400 hours, may be employed.

My interpolymerization reaction is promoted by the presence of free radicals, particularly those obtained by the thermal decomposition of peroxides, e. g., organic peroxides including acetyl peroxide, benzoyl peroxide and tertiary-butyl hydroperoxide. Such promoters are usually employed in amounts of from 0.1 to 20.0%, mainly from 0.1 to 5.0%, by weight of the reactant mixture and may be added either at the beginning or incrementally throughout the reaction, the latter method often being preferable where reaction times exceed 36 hours duration.

The course of the reaction can be followed by measuring the increasing viscosity of the reaction mixture, and the product can be isolated by precipitation through addition of a non-solvent, e. g., n-hexane or diethyl ether, or by removal of any unreacted starting materials by preferential extraction or distillation. Although it is unnecessary for most commercial applications, my interpolymers can be further purified, e. g., for analytical purposes, by solution in a minimum volume of solvent and precipitation by dilution with an excess of n-hexane or diethyl ether.

My new interpolymers can be employed in the solid form as molding powders for the preparation of various objects including rods, blocks and sheets. Alternatively, the soluble types can be dissolved in appropriate solvents for use as coating, impregnating and laminating compositions. For such purposes the crude interpolymerization reaction mixtures can themselves be employed by dilution with a suitable high-boiling solvent and subsequent removal of unreacted trichloroalkene and/or olefinic compound, e. g., by distillation. Suitable inert addends including dyes, pigments, plasticizers and fillers can be incorporated with my interpolymers by conventional dispersing techniques such as milling, mutual solution and/or agitation, in the presence of diluents.

The soluble, unsaturated resins of my invention which are derived from the interpolymerization of a trichloroalkene with a polyolefinic ester, are capable of undergoing further polymerization, especially when heated at 25–200° C. in the presence of catalysts, to yield solvent and heat-resistant moldings, coatings, castings, films, laminates, etc. For such purposes my soluble, convertible type of resin may also be dissolved in liquid, copolymerizable ethylenic compounds, e. g., butyl acrylate, tolyl acrylate, allyl acrylate, vinyl butyrate, styrene, diethyl fumarate and diallyl fumarate, to obtain solutions capable of being totally polymerized and leaving no solvent to be evaporated. Such solutions are particularly useful as initially fluid molding compositions capable of being cured with a minimum of shrinkage. They are likewise applicable to processes wherein evaporation of a solvent would constitute a technical hazard.

The following examples disclose my invention in more detail. All parts are by weight.

EXAMPLE 1

A mixture of 145.5 parts of 3,3,3-trichloropropene, 43 parts of methyl acrylate and 0.726 part of benzoyl peroxide is heated at 100° C. for 3 hours at which time an additional 0.726 part of the peroxide is added and heating is continued for 3.5 additional hours. The reaction mixture is then cooled and poured into n-hexane. The precipitated copolymer is further purified by solution in chloroform and reprecipitation by the addition of n-hexane. After drying for 4 hours at 105° C. in a circulating air oven, 79 parts of a white, polymeric solid are obtained which begins to soften at approximately 55° C.

Analysis: Found, C, 43.03%; H, 4.78%; Cl, 31.57%; limiting viscosity in toluene, 0.054. The analysis corresponds to that of a copolymer containing approximately 43.0% by weight of 3,3,3-trichloropropene and 57.0% of methyl acrylate.

EXAMPLE 2

Forty-eight and one-half parts of 3,3,3-trichloropropene together with 52.7 parts of dimethyl itaconate and 0.29 part of benzoyl peroxide are heated at about 100° C. for 10 hours during which time two increments of 0.29 part each of the peroxide are added at 3 and 6 hours of reaction time, respectively. The reaction product is isolated and purified as in Example 1 to yield 56.4 parts of polymeric solid which begins to soften at about 95° C.

Analysis: Found, C, 49.47%; H, 5.83%; Cl, 10.41%. The analysis corresponds to a copolymer containing approximately 14.2% by weight of 3,3,3-trichloropropene and 85.8% of dimethyl itaconate.

EXAMPLE 3

A mixture of 94.5 parts of 3,3,3-trichloropropene, 55.9 parts of vinyl acetate and 3.16 parts of benzoyl peroxide is heated at 60° C. for 44 hours. The reaction mixture is then cooled, dissolved in choloroform and precipitated by the addition of n-hexane. After re-solution and reprecipitation the purified copolymer is dried in vacuo to yield 105 parts of white polymeric solid.

Analysis: Found, C, 36.83%; H, 3.95%; Cl, 44.92%; limiting viscosity in acetone, 0.05. The analysis corresponds to a copolymer containing approximately 61.4% by weight of 3,3,3-trichloropropene and 38.6% of vinyl acetate.

EXAMPLE 4

The following copolymerizations of 3,3,3-trichloropropene with varying proportions of vinyl acetate are carried out at 60° C. The polymeric products are isolated by precipitation from a chloroform, benzene or acetone solution by the addition of n-hexane, and purification is effected by re-solution in benzene, freezing the solution and subliming out the benzene under a high vacuum.

Table I

| | 3,3,3-Tri-chloro-pro-pene | Vinyl acetate | Benzoyl peroxide | Reaction time (hours) | Copolymer, yield | Analysis (percent chlorine) | Percent tri-chloro-pro-pene in copolymer |
|---|---|---|---|---|---|---|---|
| 1 | 23.1 | 54.9 | 0.196 | 192.0 | 47.2 | 31.85 | 43.5 |
| 2 | 58.0 | 137.0 | .400 | 51.0 | 31.7 | 35.25 | 48.0 |
| 3 | 144.0 | 86.2 | .400 | 51.0 | 36.2 | 44.73 | 60.8 |
| 4 | 231.0 | 34.7 | .400 | 51.0 | 12.7 | 53.72 | 73.0 |
| 5 | 172.7 | 22.5 | .300 | 48.0 | 13.3 | 54.76 | 74.8 |

EXAMPLE 5

The following copolymerizations of 3,3,3-trichloropropene with styrene are carried out at 60° C., the products being isolated and purified as in Example 4 above.

*Table II*

| | 3,3,3-tri-chloro-pro-pene | Sty-rene | Ben-zoyl per-oxide | Re-action time (hours) | Co-poly-mer, yield | Analy-sis (per-cent chlor-ine) | Percent tri-chloro-pro-pene in copoly-mer | Initial soften-ing point (° C.) |
|---|---|---|---|---|---|---|---|---|
| 1 | 115.8 | 20.9 | 0.20 | 25 | 28.9 | 3.78 | 5.14 | 115.0 |
| 2 | 74.4 | 52.5 | .20 | 48 | 17.8 | 11.76 | 16.0 | |
| 3 | 30.2 | 82.8 | .20 | 96 | 22.2 | 26.66 | 36.3 | 125.0 |

EXAMPLE 6

Two copolymerizations of 3,3,3-trichloropropene with acrylonitrile at 60° C are summarized below in Table III. These copolymers are markedly less soluble in many of the solvents employed in previous examples, but adequate purification can be secured by extracting them with ethanol to remove unreacted starting materials, and drying.

*Table III*

| | 3,3,3-tri-chloro-propene | Acry-loni-trile | Ben-zoyl per-oxide | Reac-tion time (hours) | Co-poly-mer, yield | Analy-sis (per-cent ni-trogen) | Percent tri-chloro-propene in copo-lymer | Initial soften-ing point (° C.) |
|---|---|---|---|---|---|---|---|---|
| 1 | 151.0 | 54.0 | 0.20 | 6 | 14.75 | 21.24 | 19.5 | 140.0 |
| 2 | 86.6 | 7.8 | .15 | 41 | 4.97 | 12.22 | 53.6 | 125.0 |

Such copolymers are particularly useful for the preparation of thermoplastic, solvent-resistant sheeting and molded articles.

The preceding examples have disclosed a variety of the soluble, thermoplastic types of my new interpolymers. The following examples illustrate the highly useful soluble, convertible (i. e., thermosetting) type of resins which can likewise be prepared according to my invention.

EXAMPLE 7

Mixtures of various pololefinic allyl esters with various trichloroalkenes are heated at 60° C. in the presence of benzoyl peroxide and in the presence or absence of various copolymerizable monoolefinic compounds. In each case the reactions are continued until the point of incipient gelation is attained or until no further increase in the viscosity of the reaction mixture can be detected. The reaction mixtures are then diluted with n-hexane or diethyl ether, and the precipitated interpolymers are further purified by repeated solution in a minimum volume of acetone and precipitation with hexane or ether. The products are finally dried in vacuo to constant weight.

In Table IV are summarized the amounts of the monomeric starting materials, the peroxide and the polymeric products as well as the reaction times. To emphasize the advantages of my invention, the polymerization and copolymerization of the polyolefinic allyl esters in the absence of my trichloroalkenes are likewise included.

*Table IV*

| | Polyolefinic ester | | Trichloroalkene | | Copolymerizable mono-olefinic compound | | Ben-zoyl per-oxide | Reac-tion time (hours) | Poly-meric prod-uct |
|---|---|---|---|---|---|---|---|---|---|
| 1 | Allyl acrylate | 100 | | | | | 0.02 | 2.0 | 7.83 |
| 2 | do | 100 | 3,3,3-trichloropropene | 10.0 | | | .02 | 1.0 | 16.0 |
| 3 | do | 100 | do | 100.0 | | | .2 | 4.5 | 94.0 |
| 4 | do | 100 | 4,4,4-trichloro-2-methyl-1-butene | 100.0 | | | .2 | 71.25 | 21.8 |
| 5 | do | 100 | | | Styrene | 50.0 | .02 | 2.3 | 3.15 |
| 6 | do | 100 | 1,1,3-trichloropropene | 200.0 | do | 50.0 | .2 | [1]100.0 | 57.8 |
| 7 | do | 100 | | | do | 172.0 | .07 | 7.5 | 12.6 |
| 8 | do | 100 | 3,3,3-trichloropropene | 200.0 | do | 172.0 | 4.0 | 12.75 | 216.0 |
| 9 | do | 100 | | | Diethyl fumarate | 50.8 | .02 | 2.75 | 5.55 |
| 10 | do | 100 | 1,1,3-trichloropropene | 200.0 | do | 50.0 | .40 | 90.3 | 69.0 |
| 11 | Allyl methacrylate | 100 | | | | | .02 | 6.75 | 4.07 |
| 12 | do | 100 | 1,1,3-trichloropropene | 100.0 | | | .60 | 4.25 | 21.6 |
| 13 | do | 100 | 4,4,4-trichloro-2-methyl-1-butene | 100.0 | | | .60 | 28.7 | 25.8 |
| 14 | Diallyl fumarate | 100 | | | | | .24 | 1.2 | 10.6 |
| 15 | do | 100 | 3,3,3-trichloropropene | 8.2 | | | .07 | 1.3 | 13.4 |
| 16 | do | 100 | do | 111.1 | | | .32 | 7.5 | 41.5 |
| 17 | do | 100 | do | 173.0 | | | .42 | 10.5 | 63.0 |
| 18 | do | 100 | do | 297.0 | | | 1.23 | 3.5 | 85.1 |
| 19 | do | 100 | do | 668.0 | | | 3.07 | 5.6 | 198.0 |
| 20[2] | do | 100 | do | 668.0 | | | [3]2.68 | 82.0 | 221.0 |
| 21 | do | 100 | 1,1,3-trichloropropene | 8.2 | | | .07 | 2.0 | 12.9 |
| 22 | do | 100 | do | 111.1 | | | 1.24 | 3.5 | 41.5 |
| 23 | do | 100 | do | 173.0 | | | 2.05 | 5.0 | 51.6 |
| 24 | do | 100 | do | 297.0 | | | 6.20 | 7.2 | 84.5 |
| 25 | do | 100 | 4,4,4-trichloro-2-butene | 122.0 | | | 1.54 | .7 | 36.0 |
| 26 | do | 100 | do | 735.0 | | | 12.40 | 6.3 | 82.5 |
| 27 | do | 100 | do | 1900.0 | | | 29.60 | [1]122.0 | 109.0 |
| 28 | do | 100 | 4,4,4-trichloro-2-methyl-1-butene | 29.3 | | | 1.62 | 6.5 | 33.0 |
| 29 | do | 100 | do | 88.4 | | | 2.45 | 8.9 | 58.5 |
| 30 | do | 100 | | | Styrene | 53.3 | 1.0 | 12.0 | 2.3 |
| 31 | do | 100 | 3,3,3-trichloropropene | 200.0 | do | 53.3 | 4.0 | 7.9 | 71.0 |
| 32 | do | 100 | 1,1,3-trichloropropene | 10.0 | do | 53.3 | .2 | 2.5 | 20.0 |
| 33 | do | 100 | | | Vinyl acetate | 43.8 | .5 | 3.0 | 7.4 |
| 34 | do | 100 | 1,1,3-trichloropropene | 200.0 | do | 43.8 | .6 | 10.9 | 42.0 |
| 35 | Diallyl maleate | 100 | | | | | .21 | 5.3 | 19.4 |
| 36 | do | 100 | 3,3,3-trichloropropene | 298.0 | | | 6.15 | 24.0 | 124.0 |
| 37 | do | 100 | do | 668.0 | | | 24.7 | [1]92.0 | 318.0 |
| 38 | Diallyl itaconate | 100 | | | | | .21 | 2.2 | 13.9 |
| 39 | do | 100 | 3,3,3-trichloropropene | 278.0 | | | 5.77 | 2.8 | 71.0 |
| 40 | do | 100 | | | Styrene | 50.0 | 2.3 | 2.1 | 38.5 |
| 41 | do | 100 | 1,1,3-trichloropropene | 100.0 | do | 50.0 | 4.0 | 71.3 | 47.5 |
| 42 | Triallyl aconitate | 100 | | | | | 3.0 | 16.3 | 37.0 |
| 43 | do | 100 | 3,3,3-trichloropropene | 100.0 | | | 4.0 | 80.75 | 103.2 |
| 44 | Diallyl phthalate | 100 | | | | | .31 | 11.0 | 28.1 |
| 45 | do | 100 | 3,3,3-trichloropropene | 100.0 | | | 2.0 | 49.0 | 113.9 |
| 46 | do | 100 | | | Methyl acrylate | 45.0 | .04 | 1.75 | 12.8 |
| 47 | do | 100 | 3,3,3-trichloropropene | 200.0 | do | 44.0 | 4.0 | 9.9 | 121.0 |
| 48 | Diallyl adipate | 100 | | | Diethyl fumarate | 25.0 | 2.0 | 5.5 | 17.0 |
| 49 | do | 100 | 1,1,3-trichloropropene | 100.0 | do | 25.0 | .6 | 9.9 | 69.0 |

[1] No evidence of incipient gelation.
[2] Run at 90° C.
[3] Benzoyl peroxide replaced by tertiary-butyl hydroperoxide.

Analyses of a number of the above soluble, convertible interpolymers of diallyl fumarate, maleate and itaconate clearly show the increasing conversion of the monomeric diallyl ester to the soluble interpolymeric form with increasing amounts of the trichloroalkene employed.

EXAMPLE 8

In the manner of Example 7, various allyloxyalkyl polyolefinic esters are interpolymerized with trichloroalkenes in the presence and absence of other copolymerizable monoolefinic compounds. These are summarized in Table V.

(b) Seven parts of the copolymer are dissolved in 3 parts of diethyl fumarate together with 0.2 part of benzoyl peroxide. The resulting solution is heated in a mold for 24 hours at 60° C., for 3 hours at 90° C., and then for 2 hours at 120° C., to give a solvent-resistant product, which possesses good dimensional stability even at elevated temperatures. A similar insoluble and substantially infusible product is obtained when the copolymer is interpolymerized with styrene in place of the diethyl fumarate employed above.

Table V

|   | Polyolefinic ester |   | Trichloroalkene |   | Copolymerizable monoolefinic compound |   | Benzoyl peroxide | Reaction time (hours) | Polymeric product |
|---|---|---|---|---|---|---|---|---|---|
| 1 | Beta-allyloxyethyl acrylate. | 100 | | | | | [1]0.0 | 0.5 | 9.3 |
| 2 | do | 100 | 3,3,3-trichloropropene | 100 | | | .2 | 1.0 | 26.2 |
| 3 | do | 100 | do | 200 | | | 2.0 | 13.0 | 125.0 |
| 4 | do | 100 | 1,1,3-trichloropropene | 100 | | | .2 | 13.0 | 20.6 |
| 5 | do | 100 | 4,4,4-trichloro-2-methyl-1-butene | 100 | | | .2 | 91.0 | 33.2 |
| 6 | do | 100 | | | Styrene | 50 | .8 | 1.75 | 9.9 |
| 7 | do | 100 | 3,3,3-trichloropropene | 100 | do | 50 | .2 | 11.0 | 41.7 |
| 8 | do | 100 | | | Methyl acrylate | 25 | .8 | 8.9 | 6.4 |
| 9 | do | 100 | 1,1,3-trichloropropene | 200 | do | 25 | .02 | 14.0 | 39.7 |
| 10 | Di-beta-allyloxyethyl fumarate. | 100 | | | | | 1.0 | 8.3 | 22.8 |
| 11 | do | 100 | 3,3,3-trichloropropene | 100 | | | 2.0 | 6.0 | 42.2 |
| 12 | do | 100 | do | 200 | | | 5.0 | 8.9 | 61.6 |
| 13 | do | 100 | 4,4,4-trichloro-2-methyl-1-butene | 100 | | | 8.0 | [2]130.0 | 55.9 |
| 14 | do | 100 | | | Styrene | 25 | 1.0 | 1.9 | 16.9 |
| 15 | do | 100 | 3,3,3-trichloropropene | 200 | do | 25 | 5.0 | 8.9 | 66.0 |
| 16 | do | 100 | | | do | 50 | 1.0 | 2.9 | 26.8 |
| 17 | do | 100 | 3,3,3-trichloropropene | 100 | do | 50 | 4.0 | 9.25 | 73.8 |
| 18 | do | 100 | | | Vinyl n-butyl ether. | 50 | 1.5 | 7.0 | 18.9 |
| 19 | do | 100 | 3,3,3-trichloropropene | 100 | do | 50 | 4.0 | 17.5 | 75.0 |
| 20 | do | 100 | | | Diethyl fumarate | 25 | 1.2 | 1.33 | 32.0 |
| 21 | do | 100 | 1,1,3-trichloropropene | 200 | do | 25 | 4.0 | 36.0 | 77.0 |
| 22 | Di-beta-allyloxyethyl itaconate. | 100 | | | | | 2.0 | 2.6 | 22.4 |
| 23 | do | 100 | 1,1,3-trichloropropene | 100 | | | 2.0 | 24.0 | 49.4 |
| 24 | do | 100 | | | Styrene | 25 | 1.0 | 6.5 | 38.5 |
| 25 | do | 100 | 3,3,3-trichloropropene | 100 | do | 25 | 2.0 | 15.0 | 51.0 |
| 26 | Di-beta-allyloxyethyl adipate. | 100 | | | | | 2.0 | [2]168.0 | 13.7 |
| 27 | do | 100 | 1,1,3-trichloropropene | 200 | | | 4.0 | 98.3 | 25.0 |
| 28 | do | 100 | | | Diethyl fumarate | 50 | 2.0 | 11.3 | 59.2 |
| 29 | do | 100 | 1,1,3-trichloropropene | 200 | do | 50 | 4.0 | [2]100.0 | 96.5 |

[1] Use of peroxide induces uncontrollable reaction and almost instantaneous gelation.
[2] No evidence of incipient gelation.

EXAMPLE 9

A mixture of 19.6 parts of diallyl fumarate, 130.9 parts of 3,3,3-trichloropropene-1 and 2.42 parts of benzoyl peroxide is heated for 7.5 hours at 60° C. The reaction mixture is then cooled to room temperature and inspissated until a thick residual syrup is obtained. This is poured into n-hexane and the precipitated copolymer is further purified by solution in acetone and reprecipitation with n-hexane. After drying at 20° C. and 5 mm. pressure for 64 hours, 33.8 parts of white polymeric solid are obtained. The product is completely self-extinguishing by ASTM standards, and is readily soluble in acetone, benzene, chloroform, carbon tetrachloride, ethyl acetate, and xylene.

Analysis: Found, Cl, 40.49%; Iodine (Wijs) number, 34.5. The analysis corresponds to that of a copolymer containing approximately 44.8% by weight of diallyl fumarate and 55.2% of 3,3,3-trichloropropene-1. The iodine number indicates the residual unsaturation in the copolymer which is available for further polymerization.

(a) A sample of the copolymer is heated at 80° C. for 16 hours and then at 120° C. for 4 additional hours without developing any discoloration. Upon heating another sample of the copolymer at 100° C. with benzoyl peroxide as a polymerization catalyst, the material is converted to an insoluble and heat-resistant product.

EXAMPLE 10

Diallyl fumarate is copolymerized with 3,3,3-trichloropropene-1 as in Example 9 and 177 parts of the crude reaction mixture are evaporated to a viscous syrup at 20° C. and 5 mm. in the presence of 0.01 part of hydroquinone. Fifty parts of monomeric styrene are then added and distillation at 20° C. and 5 mm. is continued until the refractive index of the distillate indicates its composition to be at least 90% of styrene. At this point, 5.7 parts of styrene are added to the residual solution together with 0.42 part of benzoyl peroxide and the clear solution is poured into a plate mold where it is cured by heating at 90° C. for 4 hours. The resulting clear acetone-insoluble sheet has Rockwell hardnesses of L105 and M85, and is completely self-extinguishing when tested according to ASTM test D-638-44.

This application is a continuation-in-part of application Serial No. 707,545, filed November 2, 1946.

Having thus described my invention, what I claim and desire to protect by Letters Patent is:

1. A polymerizable mixture of a monomeric 2-dipropenyl ester of a $C_4$ to $C_8$ alpha-unsaturated alkenedioic acid and an omega-trichloroalkene having from three to five carbon atoms, in which the trichloroalkene constitutes from approximately 10 to approximately 90 mol-percent of the mixture of the ester and the trichloroalkene.

2. A polymerizable mixture of an omega-trichloroalkene having from 3 to 5 carbon atoms and a monomeric ester of a mono-olefinic alcohol and a mono-olefinic acid, and in which the trichloroalkene constitutes from approximately 10 to approximately 90 mol-percent of the mixture of the ester and the trichloroalkene.

3. A polymerizable mixture of a monomeric polyolefinic compound and an omega-trichloroalkene having from 3 to 5 carbon atoms and a terminal ethylenic linkage, and in which the trichloroalkene constitutes from approximately 10 to approximately 90 mol-percent of the mixture of the polyolefinic compound and the trichloroalkene.

4. A polymerizable mixture of a monomeric olefinic compound having from one to four ethylenic linkages and 3,3,3-trichloropropene-1, said trichloropropene being present in from 10 to approximately 90 mol-percent of the mixture of the said olefinic compound and the trichloroalkene.

5. A flame-retardant interpolymerization product of a mixture of polymerizable monomers consisting of a monomeric olefinic compound having from one to four ethylenic linkages, and 3,3,3-trichloropropene-1, in which the trichloropropene-1 constitutes from approximately 10 to approximately 90 mol-percent of the mixture of said olefinic compound and the trichloropropene-1.

6. A polymerizable mixture of an omega-trichloroalkene having from 3 to 5 carbon atoms and a monomeric polyalkenyl ester of an inorganic polybasic acid and in which the trichloroalkene constitutes from approximately 10 to approximately 90 mol-percent of the mixture of the trichloroalkene and the said ester.

7. An interpolymerization product of a mixture of polymerizable monomers consisting of an omega-trichloroalkene and a monomeric polyalkenyl ester of an inorganic polybasic acid, in which the trichloroalkene constitutes from approximately 10 to approximately 90 mol-percent of the mixture of the said ester and the trichloroalkene.

8. A polymerization product of a mixture as set forth in claim 1.

9. An interpolymerization product of a mixture of polymerizable monomers consisting of 3,3,3-trichloropropene-1 and diallyl fumarate, in which the trichloropropene-1 constitutes from approximately 10 to approximately 90 mol-percent of the mixture of the trichloropropene-1 and the said fumarate.

10. A mixture of monomeric diallyl fumarate with 3,3,3-trichloropropene-1, the proportion of the trichloropropene being from 0.1 to about 10 moles of the trichloropropene for each mole of the fumarate.

11. A method of preparing copolymers which comprises heating a mixture of from about 10 to about 90 mol-percent of an omega-trichloroalkene having from 3 to 5 carbon atoms with an unsaturated ester containing from 2 to 4 ethylenic linkages, and a peroxide polymerization catalyst.

12. A method of preparing copolymers which comprises heating a mixture of from about 10 to about 90 mol-percent of 3,3,3-trichloropropene-1 with an unsaturated ester containing from 2 to 4 ethylenic linkages, and a peroxide polymerization catalyst.

13. An interpolymerization product of a mixture of monomers consisting of an omega-trichloroalkene having from 3 to 5 carbon atoms with an unsaturated ester selected from the class consisting of allyl acrylate, allyl methacrylate, diallyl fumarate, diallyl maleate, diallyl itaconate, diallyl adipate, triallyl aconitate, diallyl phthalate, in which the trichloroalkene constitutes from approximately 10 to approximately 90 mol-percent of the mixture of said trichloroalkene and the ester.

PLINY O. TAWNEY.

REFERENCES CITED

The following references are of record in the file of this patent:

UNITED STATES PATENTS

| Number | Name | Date |
| --- | --- | --- |
| 2,378,195 | D'Alelio | June 12, 1945 |
| 2,397,724 | Cass | Apr. 2, 1946 |
| 2,443,167 | Minsk et al. | June 8, 1948 |
| 2,498,084 | Kuderna et al. | Feb. 21, 1950 |